US008549039B2

(12) United States Patent  
Seamon

(10) Patent No.: US 8,549,039 B2  
(45) Date of Patent: *Oct. 1, 2013

(54) METHOD AND SYSTEM FOR CATEGORIZING ITEMS IN BOTH ACTUAL AND VIRTUAL CATEGORIES

(75) Inventor: Joseph Socrates Seamon, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,589

(22) Filed: Jan. 4, 2012

(65) Prior Publication Data

US 2012/0102038 A1 Apr. 26, 2012

Related U.S. Application Data

(63) Continuation of application No. 12/416,081, filed on Mar. 31, 2009, now Pat. No. 8,117,231, which is a continuation of application No. 09/733,767, filed on Dec. 8, 2000, now Pat. No. 7,523,114.

(60) Provisional application No. 60/199,731, filed on Apr. 24, 2000.

(51) Int. Cl.  
*G06F 17/30* (2006.01)

(52) U.S. Cl.  
USPC .......... 707/790; 707/791; 707/792; 707/793; 707/802

(58) Field of Classification Search  
USPC .................. 707/609, 636, 726, 782, 790–793  
See application file for complete search history.

(56) References Cited

U.S. PATENT DOCUMENTS

| | | |
|---|---|---|
| 5,544,360 A | 8/1996 | Lewak et al. |
| 5,568,640 A | 10/1996 | Nishiyama et al. |
| 5,630,125 A | 5/1997 | Zellweger |
| 5,721,910 A | 2/1998 | Unger et al. |
| 5,768,580 A | 6/1998 | Wical |
| 5,802,511 A | 9/1998 | Kouchi et al. |
| 5,872,773 A | 2/1999 | Katzela et al. |
| 5,873,087 A | 2/1999 | Brosda et al. |
| 5,878,421 A | 3/1999 | Ferrel et al. |
| 5,890,138 A | 3/1999 | Godin et al. |
| 5,963,948 A | 10/1999 | Shilcrat |

(Continued)

OTHER PUBLICATIONS

"U.S. Appl. No. 09/733,767, Advisory Action mailed Mar. 7, 2007", 3 pgs.

(Continued)

*Primary Examiner* — Hanh Thai  
(74) *Attorney, Agent, or Firm* — Schwegman Lundberg & Woessner, P.A.

(57) ABSTRACT

Systems and a method are described. The method includes identifying and presenting a plurality of data items comprised of receiving a selection that identifies a parent category; identifying a first plurality of categories based on the parent category, the first plurality of categories including a first category, the plurality of data items not being user-classifiable under the first plurality of categories; identifying the plurality of data items based on a link from the first category to a second category, the second category being included in a second plurality of categories that are respectively associated with the first plurality of categories, the plurality of data items being user-classified under the second category; and communicating, over a network, a user interface response to the receiving the selection, the user interface including the plurality of data items.

20 Claims, 18 Drawing Sheets

(56) References Cited

U.S. PATENT DOCUMENTS

| | | | |
|---|---|---|---|
| 6,029,172 A * | 2/2000 | Jorna et al. | 1/1 |
| 6,038,230 A | 3/2000 | Ofek | |
| 6,055,540 A | 4/2000 | Snow et al. | |
| 6,085,193 A | 7/2000 | Malkin et al. | |
| 6,098,066 A | 8/2000 | Snow et al. | |
| 6,178,419 B1 | 1/2001 | Legh-Smith et al. | |
| 6,189,012 B1 | 2/2001 | Mital et al. | |
| 6,199,059 B1 | 3/2001 | Dahan et al. | |
| 6,216,140 B1 * | 4/2001 | Kramer | 715/234 |
| 6,286,002 B1 | 9/2001 | Axaopoulos et al. | |
| 6,321,259 B1 | 11/2001 | Ouellette et al. | |
| 6,381,607 B1 | 4/2002 | Wu et al. | |
| 6,393,423 B1 | 5/2002 | Goedken | |
| 6,396,810 B1 | 5/2002 | Hebel | |
| 6,397,221 B1 * | 5/2002 | Greef et al. | 1/1 |
| 6,401,096 B1 | 6/2002 | Zellweger | |
| 6,418,443 B1 | 7/2002 | Martin, Jr. | |
| 6,442,549 B1 | 8/2002 | Schneider | |
| 6,446,092 B1 * | 9/2002 | Sutter | 1/1 |
| 6,460,025 B1 | 10/2002 | Fohn et al. | |
| 6,489,968 B1 | 12/2002 | Ortega et al. | |
| 6,839,680 B1 * | 1/2005 | Liu et al. | 705/7.33 |
| 7,003,504 B1 | 2/2006 | Angus et al. | |
| 7,523,114 B2 | 4/2009 | Seamon | |
| 8,117,231 B2 | 2/2012 | Seamon | |
| 2009/0193002 A1 | 7/2009 | Seamon | |

OTHER PUBLICATIONS

"U.S. Appl. No. 09/733,767, Advisory Action mailed Nov. 10, 2003", 3 pgs.
"U.S. Appl. No. 09/733,767, Advisory Action mailed Nov. 10, 2005", 3 pgs.
"U.S. Appl. No. 09/733,767, Advisory Action mailed Nov. 19, 2004", 3 pgs.
"U.S. Appl. No. 09/733,767, Appeal Brief filed Mar. 21, 2007", 26 pgs.
"U.S. Appl. No. 09/733,767, Appeal Brief filed Dec. 12, 2005", 23 pgs.
"U.S. Appl. No. 09/733,767, Examiner Interview Summary mailed Jun. 6, 2005", 2 pgs.
"U.S. Appl. No. 09/733,767, Final Office Action mailed Jul. 13, 2004", 12 pgs.
"U.S. Appl. No. 09/733,767, Final Office Action mailed Jul. 23, 2003", 11 pgs.
"U.S. Appl. No. 09/733,767, Final Office Action mailed Aug. 12, 2005", 11 pgs.
"U.S. Appl. No. 09/733,767, Final Office Action mailed Aug. 31, 2006", 5 pgs.
"U.S. Appl. No. 09/733,767, Non Final Office Action mailed Feb. 9, 2005", 10 pgs.
"U.S. Appl. No. 09/733,767, Non Final Office Action mailed Feb. 27, 2003", 10 pgs.
"U.S. Appl. No. 09/733,767, Non Final Office Action mailed Mar. 8, 2006", 12 pgs.
"U.S. Appl. No. 09/733,767, Non Final Office Action mailed Jul. 10, 2007", 12 pgs.
"U.S. Appl. No. 09/733,767, Non Final Office Action mailed Dec. 29, 2003", 13 pgs.
"U.S. Appl. No. 09/733,767, Non-Final Office Action mailed Jun. 3, 2008", 10 pgs.
"U.S. Appl. No. 09/733,767, Notice of Allowance mailed Dec. 15, 2008", 5 pgs.
"U.S. Appl. No. 09/733,767, Pre-Appeal Brief Request filed Dec. 18, 2006", 5 pgs.
"U.S. Appl. No. 09/733,767, Response filed Jan. 9, 2008 to Non Final Office Action mailed Jul. 10, 2007", 20 pgs.
"U.S. Appl. No. 09/733,767, Response filed Apr. 29, 2004 to Non Final Office Action mailed Dec. 29, 2003", 16 pgs.
"U.S. Appl. No. 09/733,767, Response filed May 27, 2003 to Non Final Office Action mailed Feb. 27, 2003", 12 pgs.
"U.S. Appl. No. 09/733,767, Response filed May 31, 2005 to Feb. 9, 2005", 12 pgs.
"U.S. Appl. No. 09/733,767, Response filed Jul. 10, 2006 to Non Final Office Action mailed Mar. 8, 2006", 14 pgs.
"U.S. Appl. No. 09/733,767, Response filed Sep. 3, 2008 to Non-Final Office Action mailed Jun. 3, 2008", 10 pgs.
"U.S. Appl. No. 09/733,767, Response filed Sep. 20, 2004 to Final Office Action mailed Jul. 13, 2004", 19 pgs.
"U.S. Appl. No. 09/733,767, Response filed Oct. 12, 2007 to Non Final Office Action mailed Jul. 10, 2007", 11 pgs.
"U.S. Appl. No. 09/733,767, Response filed Oct. 21, 2003 to Final Office Action mailed Jul. 23, 2003", 6 pgs.
"U.S. Appl. No. 12/416,081, Response filed Jun. 29, 2011 to Non Final Office Action mailed Apr. 1, 2011", 8 pgs.
"U.S. Appl. No. 12/416,081, Non Final Office Action mailed Apr. 1, 2011", 10 pgs.
"U.S. Appl. No. 12/416,081, Notice of Allowance mailed Oct. 4, 2011", 13 pgs.
"U.S. Appl. No. 12/416,081, R312 mailed Jan. 12, 2012", 2 pgs.
"European Application Serial No. 01928581.6, Office Action Mailed Feb. 12, 2009", 4 pgs.
"European Application Serial No. 01928581.6, Office Action mailed Jul. 11, 2012", 7 pgs.
"European Application Serial No. 01928581.6, Response filed Feb. 7, 2013 to Examination Notification Art. 94(3) mailed Jul. 11, 2012", 19 pgs.
"International Application Serial No. PCT/US01/12398, International Search Report mailed Aug. 27, 2001", 3 pgs.
Ishikawa, H., et al., "Document warehousing based on a multimedia database system", ICDE, Proceedings of the 15th International Conference on Data Engineering, (1999), 168-173.
Praphakar, S.V.R.K., et al., "Diagnostic Reasoning Guided by Multiple Taxonomies", IEEE Engineering in Medicine and Biology Society 10th Annual International Conference, (1988), 2 pgs.
Sanchez, J. Alfredo, et al., "Mutant: Agents as Guides for Multiple Taxonomies in the Floristic Digital Library", Proceedings of the 4th ACM Conference on Digital Libraries, (Aug. 11, 1999), 244-245.

* cited by examiner

| CATEGORY TABLE | | | | | | |
|---|---|---|---|---|---|---|
| NAME *74* | ID *72* | ACTUAL_CATEGORY *86* | LEVEL1 *78* | LEVEL2 *80* | LEVEL3 *82* | IS_LEAF *76* |
| PASSENGER | 50 | ∅ | | | | N |
| FORD | 2000 | ∅ | 50 | | | N |
| TAURUS | 8000 | ∅ | 2000 | 50 | | Y |
| MODEL T | 8500 | ∅ | 2000 | 50 | | Y |
| CARS | 51 | ∅ | | | | N |
| FORD | 2001 | ∅ | 51 | | | N |
| TAURUS | 8001 | 8000 | 2001 | 51 | | N |
| VINTAGE CARS | 52 | ∅ | | | | N |
| FORD | 2002 | ∅ | 52 | | | N |
| MODEL T | 8502 | 8500 | 2002 | 52 | | N |

90 — ACTUAL CATEGORY
92 — VIRTUAL CATEGORY
94 — VIRTUAL CATEGORY

| eBay home | my eBay | sign in | ebay Motors          AutoTrader.com

| Home | Browse | Sell | Enthusiasts | Search | Services | Help |

C A R S

| Cars | Luxury Cars | Sports Cars | SUV | Trucks | MiniVans | Motorcycles | Collector | Other Vehicles | Parts | Automobilia |

Search: [Cars ▽] [_____] [Search]

☐ Search titles and description  More Options...

Home>Browse>Cars

| click here to see the picture | click here to see the picture | click here to see the picture | click here to see the picture |

2000 GTO    2000 All Models    2000 Royal    2000 928

Services
- Financing
- Inspections
- Collector Car Insurance
- Vehicle Shipping
- Escrow

How To Buy
Learn more about shopping, bidding, and buying on eBay Motors. ( How To Buy )

What's New
Welcome to eBay Motors, where you can find just about anything automotive.

Browse By Make

| Acura (0) | Alfa Romeo (0) | AMC (0) |
| Aston Martin (0) | Auburn (0) | Audi (0) |
| Austin (0) | Austin Healey (0) | Avanti (0) |
| Bentley (0) | BMW (0) | Bugatti (0) |
| Buick (0) | Cadillac (0) | Chevrolet (0) |
| Chrysler (0) | Citroen (0) | Cord (0) |
| Datson (0) | DeSoto (0) | Dodge (0) |
| Eagle (0) | Edsel (0) | Ferrari (0) |
| Fiat (0) | ⌐Ford (0)⌐ ∼146 | Geo (0) |
| Honda (0) | Hyundai (0) | Infiniti (0) |
| Isuzu (0) | Jaguar (0) | Kia (0) |
| Lamborghini (0) | Lancia (0) | Lexus (0) |
| Lincoln (0) | Lotus (0) | Maserati (0) |
| Mazda (0) | Mercedes-Benz (0) | Mercury (0) |
| MG (0) | Mitsubishi (0) | Nissan (0) |
| Oldsmobile (0) | Opel (0) | Packard (0) |
| Peugot (0) | Plymouth (0) | |

Related Links

Enthusiast pages: Ford Mustang * Corvette * Harley Davidson * Muscle Cars
Related categories on eBay Motors: Automobilia * Parts & Accessories * Other Vehicles
Related categories on eBay: Diecast Toys * Vintage Toy Vehicles * Auto Advertising

FIG. 9B      ↖144

| | | | | eBay home | my eBay. | sign in |
|---|---|---|---|---| eBay Motors          *AutoTrader*.com

| Home | Browse | Sell | Enthusiasts | Search | Services | Help |
|---|---|---|---|---|---|---|

Search: [Passenger Vehicles ▼] [                    ] [Search]

☐ Search titles and description  More Options...

Home : Browse : Cars : Ford: Taurus

Featured Taurus

| click here to see the picture | click here to see the picture | click here to see the picture | click here to see the picture | -Financing<br>-Inspections<br>-Collector Car Insurance<br>-Vehicle Shipping<br>-Escrow |
|---|---|---|---|---|
| Ford : Taurus | Ford : Taurus | Ford : Taurus | Ford : Taurus | |

Browse

Items in Taurus 156

View: Current | New Today | Ending Today | Going, Going, Gone

Show items located in: [Input Error: Regions> ▼]

| Picture | Make - Model | Mileage | Year | Price | Bids | Ends PDT |
|---|---|---|---|---|---|---|
| click here to see the picture | Ford : Taurus<br>sub-title | 123 | 2000 | $1.00 | - | Apr-17 19:00 |
| click here to see the picture | Ford : Taurus<br>sub-title | 123 | 2000 | $1.00 | - | Apr-17 19:58 |
| click here to see the picture | Ford : Taurus<br>sub-title | 123 | 2000 | $1.00 | - | Apr-17 20:16 |
| click here to see the picture | Ford : Taurus<br>sub-title | 123 | 2000 | $1.00 | - | Apr-17 20:34 |
| click here to see the picture | Ford : Taurus<br>sub-title | 123 | 2000 | $1.00 | - | Apr-17 20:51 |
| click here to see the picture | Ford : Taurus<br>Automated Test 4/07/00 | 123 | 2000 | $1.00 | - | Apr-17 20:37 |

FIG. 9D

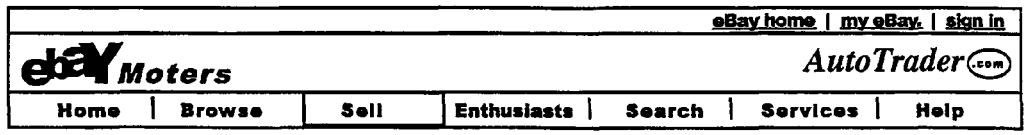

We recommend you check out How to Sell - Vehicles before you begin.

You are selling a Passenger Vehicle. If this is not correct, see Seller's Overview

| Item Information |
|---|

User ID & Password
Don't have a password?
Register now, its free!  User ID or Email address        Password (forgotten it?)

All this information will be included in your item listing. Be sure to include other details in your item description.

Make Acura change make    172

Model [CL ▼] if "All/Other Models" please specify
[                    ] (optional)

Year [Please choose one ▼]

Sub Model
ex. DX, SI, Turbo, GT
optional

VIN
Vehicle Identification Number
What is a VIN?   Required for Saturn inspections. Otherwise optional, but strongly recommended due to high importance to buyers.

Type of Vehicle Title
How do I find this out?   ⊙ Clear (most titles) ○ Salvage  ○ Other (specify in Description)

Mileage [        ] miles (If in kilometers please convert to miles)
ex. 45,000

Color  Exterior [Please choose one ▼]  Interior [Please choose one ▼]

Number of Cylinders
Where do I find this?  [Please choose one ▼]

Transmission [Automatic ▼]

Number of Doors [2 doors ▼]

Condition
How do I find this out?  ⊙ Used  ○ New

Vehicle Inspection  ⊙ None  ○ Saturn  ○ Other (Specify in description)

FIG. 10B

How can I get my vehicle inspected?

Options ☐ Air conditioning ☐ CD Player Airbags Power Options ←170
How do I find this out? ☐ Convertible ☐ 4 Wheel Drive ☐ Driver Airbag ☐ Anti Lock Brakes
☐ Cruise Control ☐ Leather Seats ☐ Passenger Airbag ☐ Power Locks
☐ Sunroof ☐ Side Airbags ☐ Power Seats
☐ Cassette ☐ Power Windows

Is There an Existing Warranty? ⦿ No
How do I find this out? ○ Yes (specify Year/Mileage warranty expiration in Item Description)

Items Subtitle [                                      ]
Title Tips 45 characters max
Include vehicle highlights here like no reserve, low miles, great condition.
Make, model, year are automatically included in the listings.
Do not include HTML tags, asterisks, or quotes, as they interfere with Search.

Item Description
Enter additional description
We recommend reading our Description Tips You can use basic HTML tags to spruce up your listing You can add links to additional photos, but enter your primary photo in the Picture URL below.

Note: If you want more than one photo for your item, insert its URL (web address) in the Description section in the following format: <img src="http://www.anywhere.com/mypicture.jpg">

Gallery / Picture URL [http://                                 ]
optional Please use only .jpg, bmp or tif files. gif files will not appear.
For best results, use an image that is at least 250 pixels wide.
Why we recommend using a photo This picture will appear in listings as a gallery thumbnail and in the item description.
This options is free!

It's easy! Learn the basics in the tutorial, and enter your URL (web address) here.

Item Location [                                      ]
Enter Item location and region if item is located in the United States City, State (e.g., San Jose, CA)
Learn more about regional setting [Choose the region nearest to you ▼] 
"Go Local" Regions (US items only)

[United States ▼] 
Country

| Make your item stand out and get more bids! Try these winning options. |
|---|

FIG. 10C

| | | ⟵ 170 |
|---:|:---|:---|
| eBay Featured<br>Details | ☐ $99.95 charge | |
| Gallery Featured<br>Details | ☐ $99.95 charge | |
| Category Featured<br>Details | ☐ $14.95 charge | |
| Boldface Title<br>Details | ☐ $4.00 charge | |
| Listing Icon<br>Details | $2.00 charge<br>◉ No Icon  ○ [US Flag]  ○ [Checkered Flag]  ○ [4X4]  ○ [Gift]<br>○ [Graduation] | |

Auction Information

| | |
|---:|:---|
| Payment Methods<br>Choose all that you will accept. Enter specific payment information Item Description | ☐ Money Order/Cashiers Check  ☐ Personal Check  ☐ Visa/MasterCard<br>☐ COD (collect on delivery)  ☐ Discover  ☐ American Express<br>☑ See Item Description  ☐ Other |
| Escrow<br>learn more | ○ I will accept escrow, buyer pays (recommended)<br>○ I will pay for escrow<br>◉ I will not accept escrow (if selected, the Escrow section will not appear on the item listing) |
| Where Will You Ship Your Vehicle?<br>See tips on shipping | ◉ Will ship to United States only<br>○ Will ship internationally (worldwide)<br>○ Will ship to United States and the following regions: (Check all that apply)<br>　☐ Canada<br>　☐ Europe<br>　☐ Australasia<br>　☐ Asia<br>　☐ South America<br>　☐ Africa<br>　☐ Mexico and Central America<br>　☐ Middle East<br>　☐ Caribbean<br>○ Will not ship |
| Who Pays For Shipping? | ☐ Seller Pays Shipping　　　　　☐ Buyer Pays Fixed Amount.<br>☐ Buyer Pays Actual Shipping Cost　☑ See Item Description |
| Starting Bid<br>See tips on setting starting bid amounts | [　　　　　　]<br>(e.g., 2.00 - Please do not include commas or currency symbols, such as $.) |

| Auction Duration | [7 ▾] days |
| --- | --- |

Reserve Price
optional
See tips on setting Reserve Prices.

[          ] (e.g., 15.00 - Please do not include commas or currency symbols, such as $.)
Careful! Reserve Auction fees will apply if you item does not sell. Learn more

Private Auction?
optional
Private Auction Details

☐ Yes, this is a private auction.
Don't use this unless you have a specific reason.

Press "Continue" to preview the item and review fees. You will not incur any fees until you accept the terms disclosed in the next screen.

| Continue | Clear form and start over |
| --- | --- |

Note: If the Back button on your browser erases your information on this form, learn how to fix this.

Home   Browse   Sell   Enthusiasts   Search   Services   Help

FIG. 10E

METHOD AND SYSTEM FOR CATEGORIZING ITEMS IN BOTH ACTUAL AND VIRTUAL CATEGORIES

RELATED APPLICATIONS

The present application is a continuation of U.S. application Ser. No. 12/416,081, filed on Mar. 21, 2009, which is a continuation application that claims priority from U.S. application Ser. No. 09/733,767, filed on Dec. 8, 2000, now issued as U.S. Pat. No. 7,523,114 issued on Apr. 21, 2009 which claims priority from U.S. provisional patent application No. 60/199,731 entitled "Method and System for Categorizing Items in Both Actual and Virtual Categories" filed Apr. 24, 2000 all of which are incorporated herein by reference in their entirety.

FIELD OF THE INVENTION

The present invention relates generally to the field of database architecture and, more specifically, to the categorizing of database items in both an actual category and a virtual category.

BACKGROUND OF THE INVENTION

Web sites, or other network-based data aggregators or presenters, commonly use category schemas to provide context and structure for data items. For example, within an on-line web site directory, such as that presented by Yahoo! Incorporated of Santa Clara, Calif., web sites are commonly classified under an extensive category schema.

Within commercial web sites, product or service offerings are also commonly classified under a category schema so as to enable convenient user navigation of offerings to locate offerings of interest. For example, eBay, Incorporated of San Jose, Calif., implements an extensive categorization schema for an on-line auction service. Specifically, a seller wishing to post an item for auction on the on-line auction facility is required to specify a category for the relevant product offering.

BRIEF DESCRIPTION OF THE DRAWINGS

The present invention is illustrated by way of example and not limitation in the figures of the accompanying drawings, in which like references indicate similar elements and in which:

FIG. 5 is a diagrammatic representation of an exemplary populated category table, which is populated with exemplary records from both an actual category as well as two virtual categories.

FIG. 9B illustrates an example of a markup language document that may present an exemplary list of mixed-level categories.

FIG. 9D is an example of a markup language document that may be utilized to present a narrowed list of data items.

FIGS. 10B-10E illustrate a further interface via which a user may specify actual category information.

DETAILED DESCRIPTION

A method and system for categorizing items in both actual and virtual categories are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

The term "virtual category" shall be understood to be a category that, for a particular data item, is not directly recorded as being associated with the data item. Nonetheless, a "virtual category" may, for a further data item, be directly recorded as an appropriate category, and for such a further data item will comprise an "actual category" (or a "real category").

Transaction Facility

Figure 1:
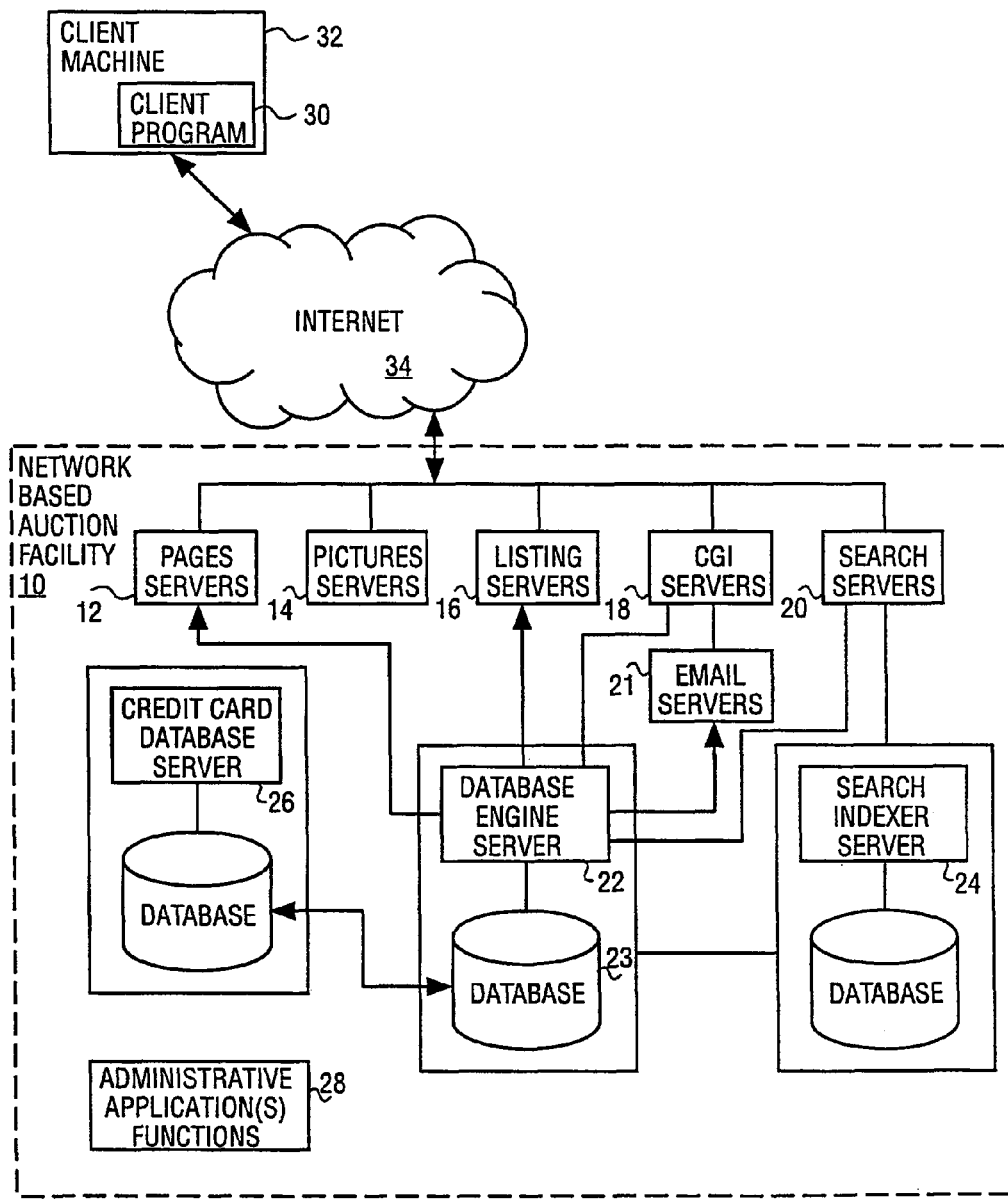
FIG. 1 is a block diagram illustrating an exemplary network-based transaction facility in the form of an internet-based auction facility 10.

FIG. 1 is block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
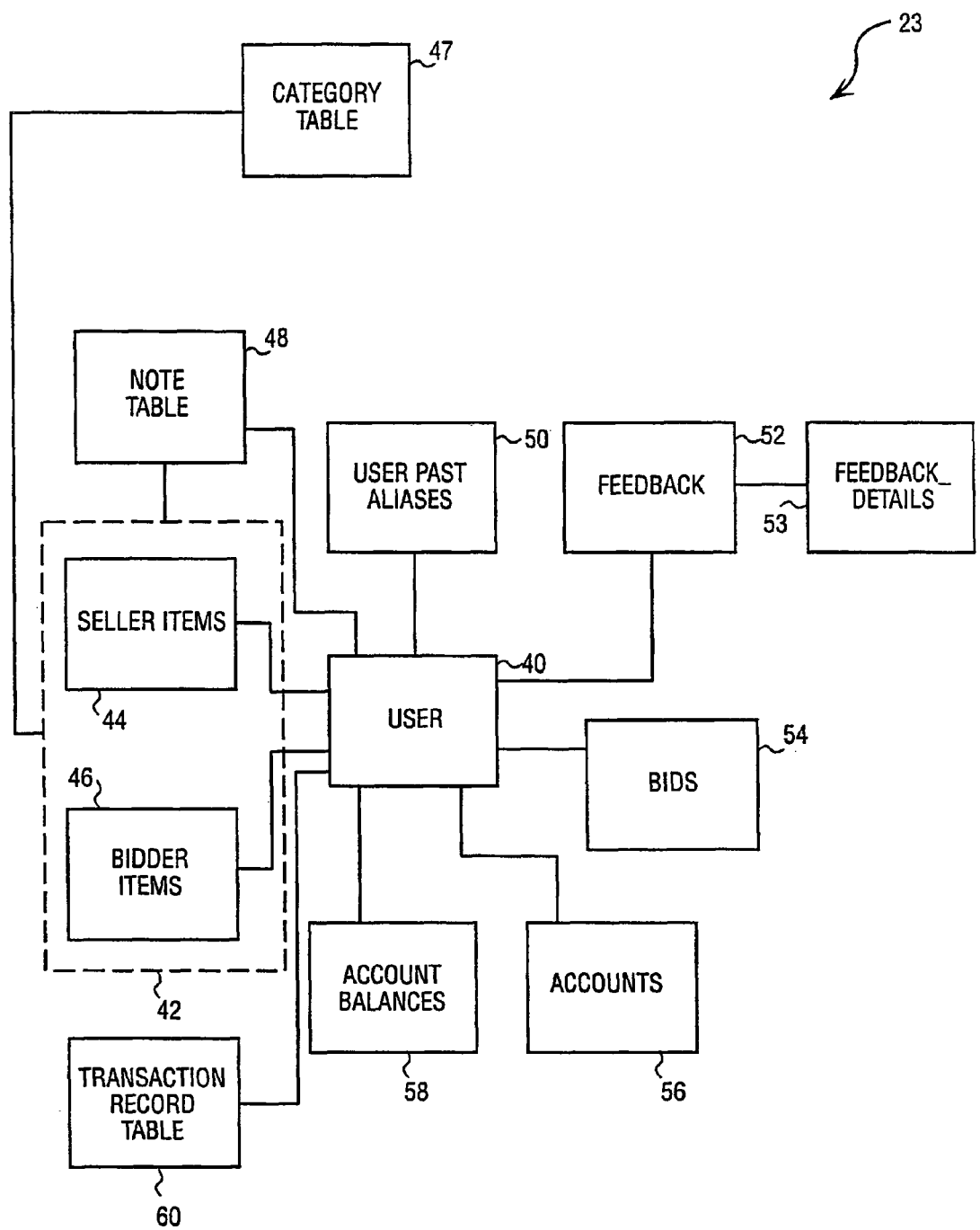
FIG. 2 is a database diagram illustrating an exemplary database, maintained and accessed via a database engine server, which at least partially implements and supports the auction facility.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42.

Figure 3:
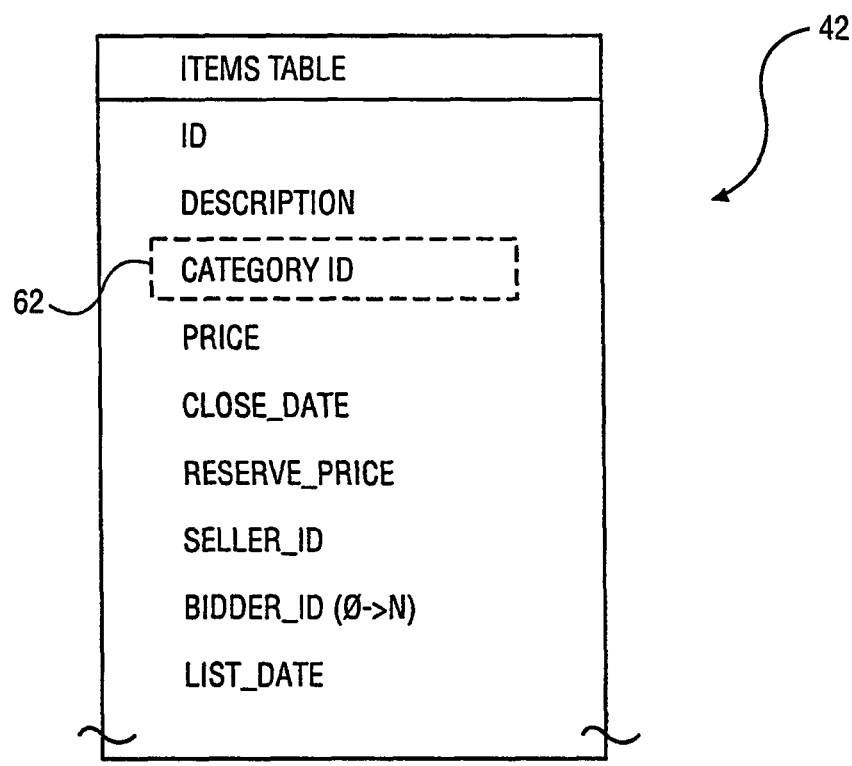
FIG. 3 is a representation of an item table, according to an exemplary embodiment of the present invention, that may include a category identifier corresponding to an identifier of one or more real categories defined within a category table of the database.

The database 23 also includes one or more category tables 47. Each record within the category table 47 describes a respective category. In one embodiment, a specific category table 47 may describe multiple, hierarchical category structures, and include multiple category records, each of which may describe the context of a particular category within the one of the multiple hierarchical category structures. For example, the category table 47 may describe a number of real, or actual, categories to which item records, within the item tables 42, may be linked. For example, as shown in FIG. 3, an item table 42 may include a category identifier 62 corresponding to an identifier of one or more real categories defined within the category table 47.

The category table 47 may also define a number of "virtual" hierarchical category structures that support alternative navigation paths that may be presented to a user to locate a particular item. In one embodiment, categories of a "virtual" hierarchical category structure are not directly referenced within item records within the item tables 42, but are instead linked to "real" categories. Accordingly, in one embodiment, no category identifiers 62 within the item tables 42 point directly to a "virtual" category. As will be described in further detail below, multiple virtual categories may be linked to a single real category.

The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auctioned via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Category Table and Hierarchical Category Structures

Figure 4:
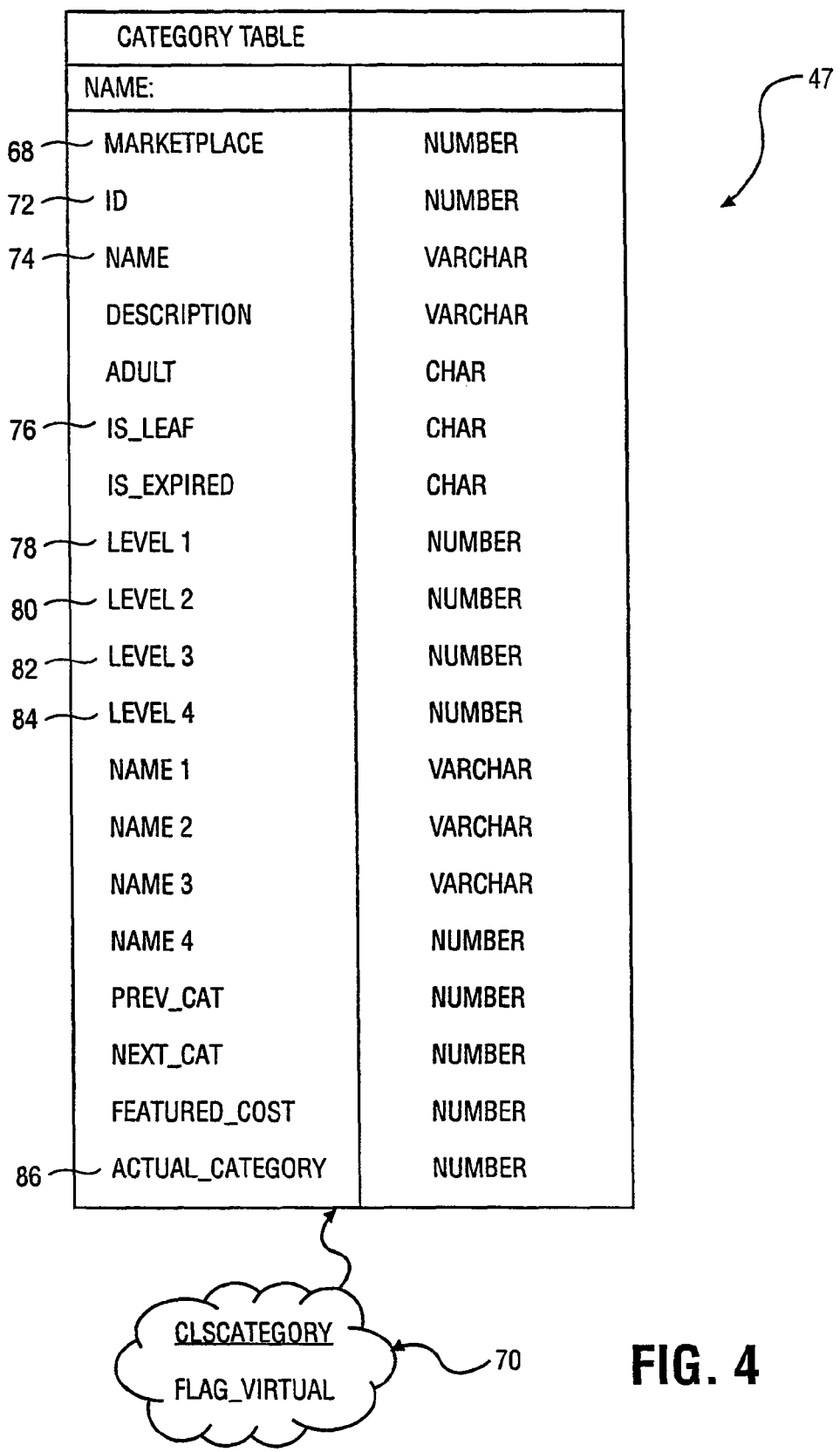
FIG. 4 is a diagrammatic representation of an exemplary category table, and of an exemplary category class, that may be instantiated as objects that reference a category table.

FIG. 4 is a diagrammatic representation of an exemplary category table 47, and of an exemplary category class 70 that may be instantiated as objects that reference the category table 47.

The category table 47 is shown to include a number of fields, each of which may be populated with relevant information for a category record within the category table 47. For each category record, a marketplace field 68 indicates a particular marketplace (e.g., automobiles, computers, collectibles, etc.) within the context of the network-based auction facility 10 to which the category pertains. An identifier field 72 contains a unique category identifier for each category record. A name field 74 similarly includes a name (which need not be unique) for the relevant category.

An IS_LEAF field 76, for each category record, is populated with a character that indicates whether the relevant category is a leaf category of a particular hierarchical category structure (e.g., an actual or virtual category structure). The level1-level4 fields 78-84 record the category identifiers of categories from which a particular category depends within the context of hierarchical category structure. For example, the level1 field 78 will record the category identifier for an immediate parent category, while the level2 field 80 will record the category identifier for a grandparent category.

An actual_category field 86 is, in one embodiment, only populated for a virtual category, and stores the category identifier of an actual (or real) category to which the relevant virtual category is linked.

FIG. 5 is a diagrammatic representation of an exemplary populated category table 47, that is populated with exemplary records for both an actual category 90, as well as two virtual categories 92 and 94.

Turning first to the hierarchy of actual categories 90, a parent (passenger vehicle) category includes a "Ford" child category, the "Ford" category being indicated as a child of the "passenger car" category by inclusion of the category identifier (e.g., 50) within the level1 field 78 of the record for the "Ford" category. The "Ford" category in turn is shown to include a "Taurus" sub-category and a "Model T" sub-category. It will be noted the "Taurus" and the "Model T" categories are indicated in the IS-LEAF field 76 as being leaf categories of the hierarchy of actual categories 90. It will furthermore be noted that, for each category within the hierarchy of actual categories 90, the actual_category field 86 contains a null value, as these categories are not linked to, and do not point to, further categories.

Turning now to the hierarchy of virtual categories 92, a parent "cars" category is defined to have a "Ford" child category, that in turn is defined to have a "Taurus" child category. It will be noted that the level1 field 78 of the "Ford" category includes an identifier pointing back to the parent "cars" category.

The "Taurus" category of the virtual categories 92 is also shown, within the actual_category field 86, to include the identifier of the "Taurus" category of the actual categories 90. In this way, the virtual "Taurus" category, identified by the category identifier "8001" is linked to, or points to, the actual "Taurus" category identified by the category identifier "8000". In this way, user navigation of the hierarchy of virtual categories 92, when resulting in the selection of the virtual "Taurus" category, can be utilized to identify the category identifier for an actual "Taurus" category, that can in turn be utilized to identify records within an item table 42.

Similarly, the hierarchy of virtual categories 94 is headed by a "vintage cars" category that includes a child "Ford" category and a grandchild "Model T" category. The "Model T" category is again linked, by an appropriate category identifier within the actual_category field 86, to the actual "Model T" category of the actual categories 90.

It will furthermore be noted that, in one embodiment, only real categories are indicated in the IS_LEAF field 76 as being leaf categories.

In one embodiment of the present invention, as mentioned above, data items may only be categorized under a hierarchy of actual categories 90, and not under a hierarchy of virtual categories. It is for this reason that only actual categories may be indicated as leaf categories.

While the hierarchies of virtual categories 92 and 94 are indicated as being distinct hierarchies, these hierarchies may in fact be sub-hierarchies of a larger hierarchy of virtual categories. Nonetheless, the present application contemplates that the category table 47 may define multiple hierarchies of virtual categories, and that multiple virtual categories may be linked to, or pointed to, a single actual category.

Figure 6:
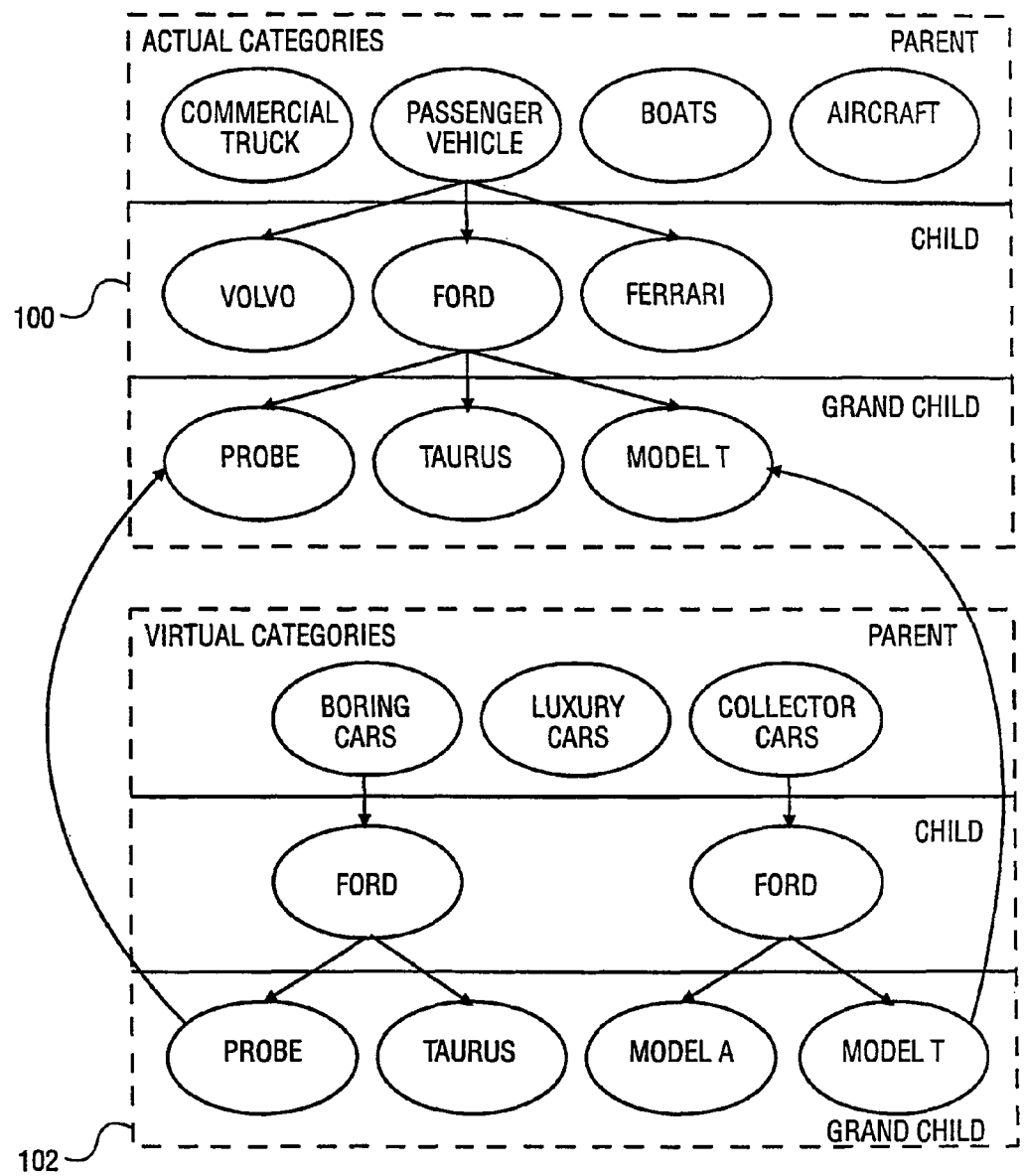
FIG. 6 is a conceptual diagram illustrating a view of selected actual categories and virtual categories within an exemplary database, as defined within one or more exemplary category tables.

FIG. 6 is a conceptual diagram illustrating a view of selected actual categories 100 and virtual categories 102 within an exemplary database, and as defined within one or more exemplary category tables 47. As illustrated, both the actual categories 100 and the virtual categories 102 are shown to include parent, child and grandchild categories. The grandchild categories, in the illustrated example, are "leaf" categories for both the actual and virtual categories 100 and 102. Leaf categories of the virtual categories are shown to be linked to appropriate "leaf" categories of the actual categories 100.

Methodologies

Figure 7:
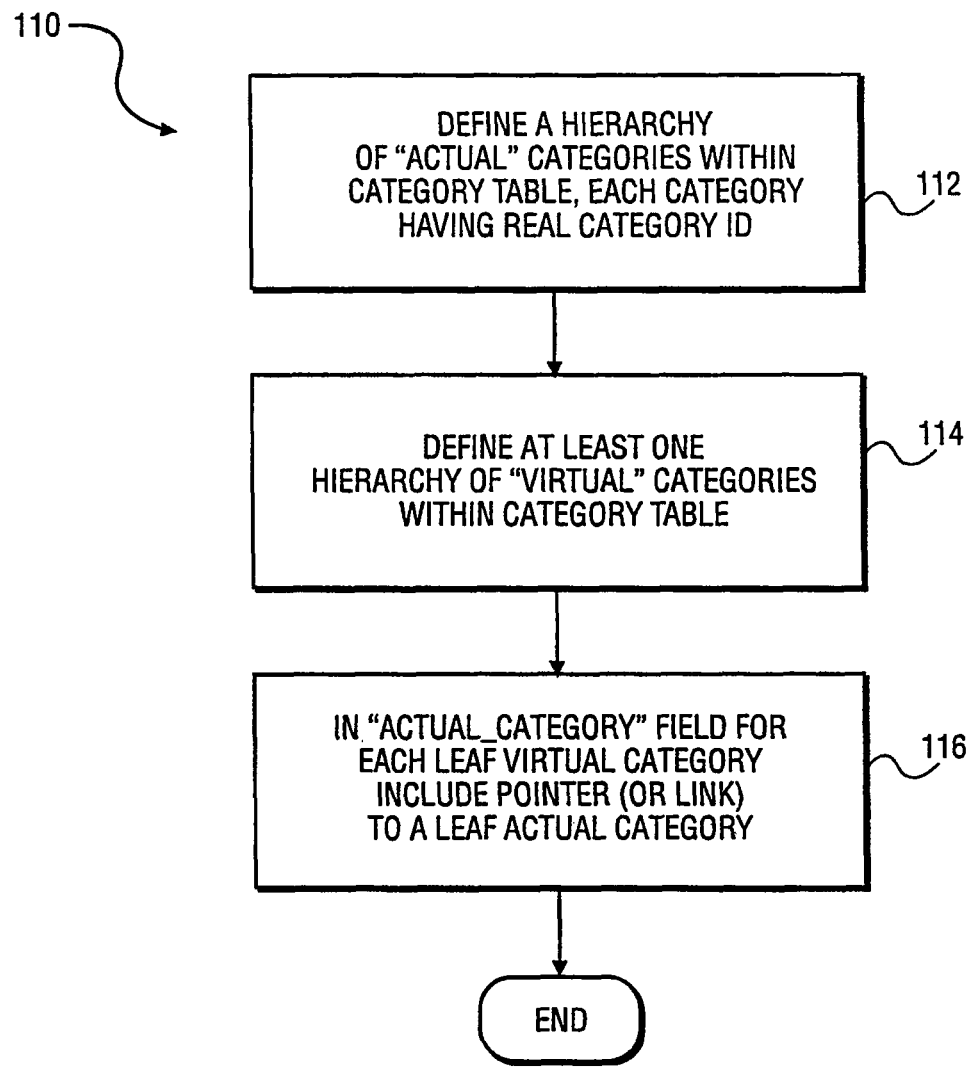
FIG. 7 is a flow chart illustrating a method, according to an exemplary embodiment of the present invention, of constructing a category structure within a database.

FIG. 7 is a flow chart illustrating a method 110, according to an exemplary embodiment of the present invention, of constructing category structures within a database. The database may, in one exemplary embodiment, support a web site that classifies data items for presentation to a user via a browser. Such data items may describe, for example, web sites, products, services or any other items that may be categorized so as to facilitate convenient location by a user. In one embodiment, the data items may describe goods and services that are offered for sale via an auction process by the network-based auction facility 10. However, it will readily be appreciated that the present invention is not limited to use in such an exemplary facility.

The method 110 commences at block 112 with the definition, for example by a database designer, of a hierarchy of "actual" categories 100 being described by a respective category records that each specify a category identifier.

At block 114, the database designer then defines at least one hierarchy and multiple hierarchies, of "virtual" categories 102 within the category table 47. In one embodiment, the virtual categories are not intended to be presented to a user for selection to categorize a data item, but are linked, in the manner described above, to actual categories.

At block 116, in an actual_category field 86 for each "leaf" virtual category, the database designer includes a pointer (or link) in the form of a category identifier to a "actual" leaf category.

Figure 8:
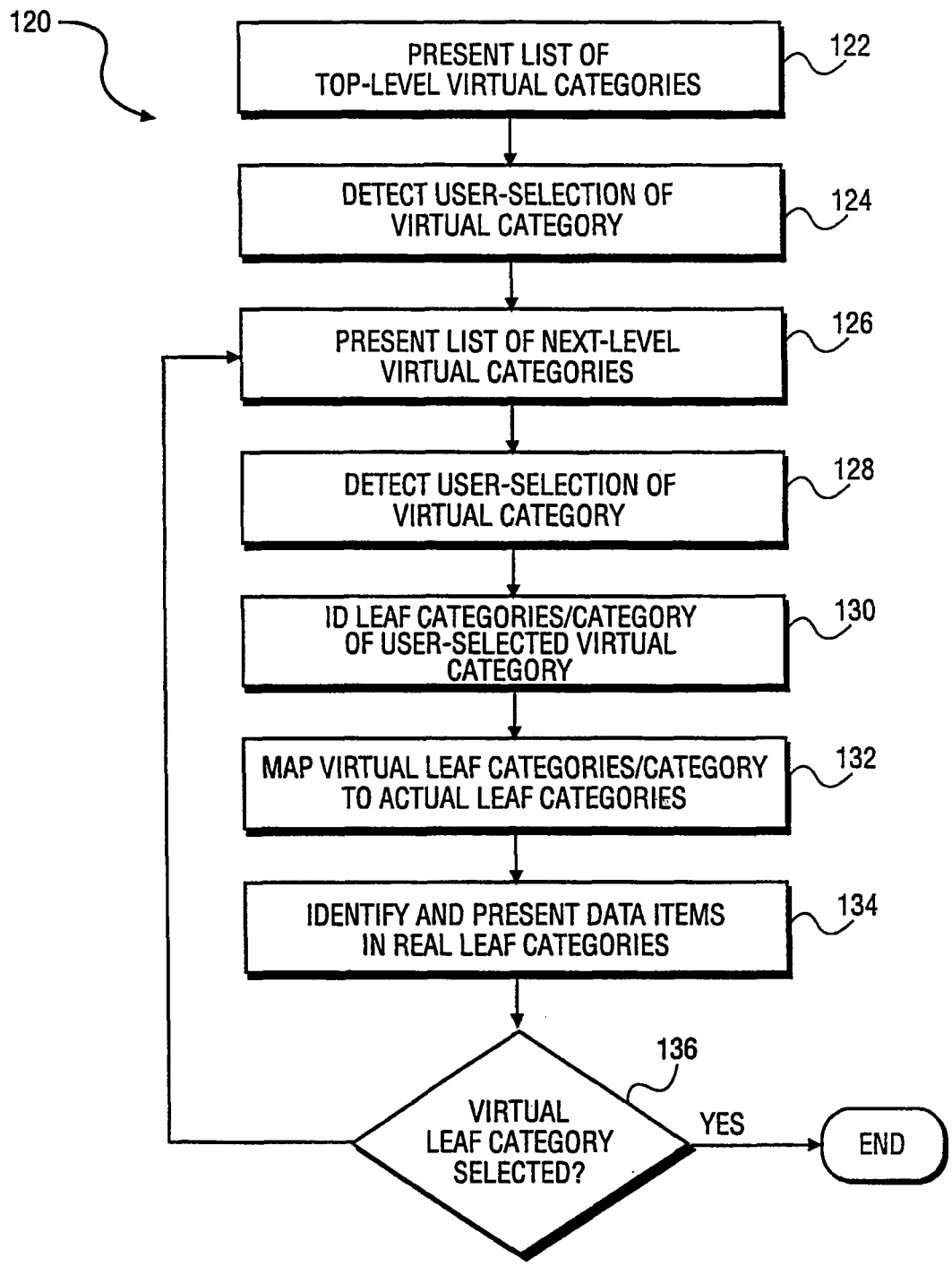
FIG. 8 is a flow chart detailing a method, according to an exemplary embodiment of the present invention, of facilitating the location of a data item by navigation of a hierarchy of virtual categories.

FIG. 8 is a flow chart detailing a method 120, according to an exemplary embodiment of the present invention, of facilitating the location of a data item by navigation of a hierarchy of virtual categories.

Figure 9A:
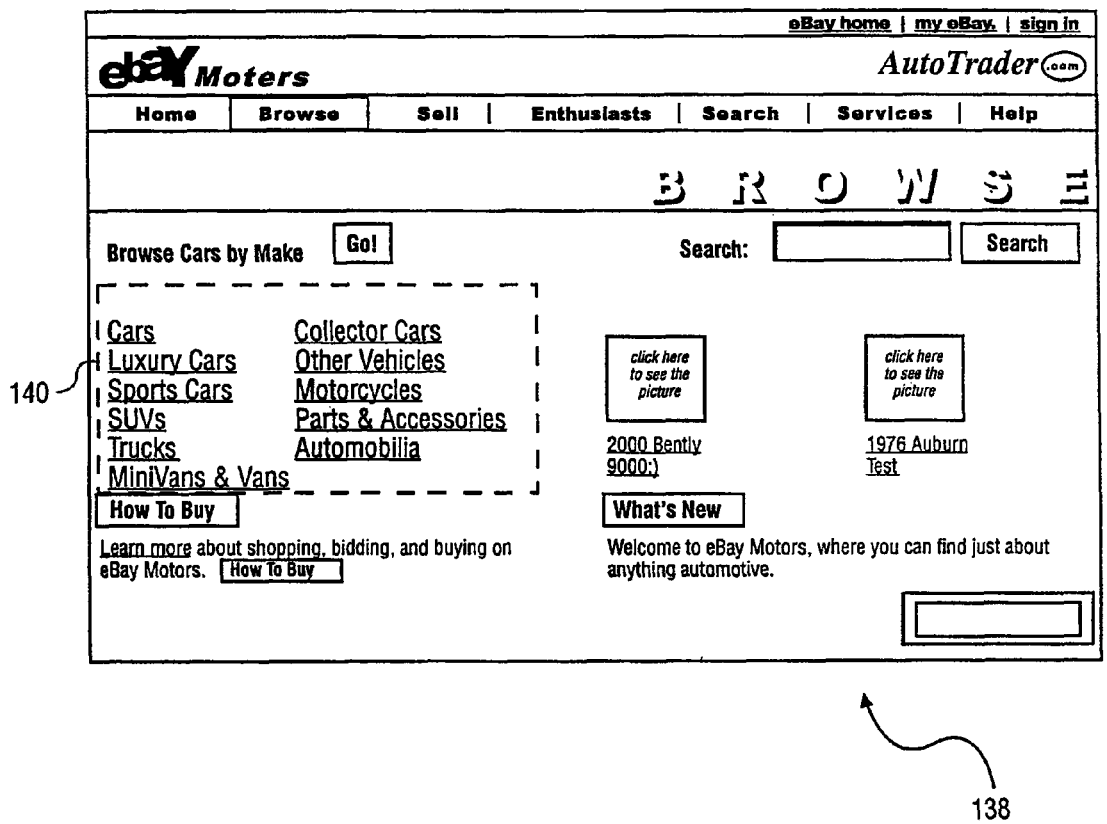
FIG. 9A provides an example of a markup language document that lists a number of top-level virtual categories.

The method 120 commences at block 122, with the presentation to a user of a list of top-level virtual categories. For example, the top-level categories may be the parent categories of the virtual categories 102 illustrated in FIG. 6. The top-level categories may furthermore be presented in the form of a markup language document (e.g., a HTML document) that is generated by a page server 12 utilizing category information retrieved by the database engine server 22 from the database 23. FIG. 9A provides an example of such a markup language document 138, which lists a number of top-level virtual categories 140.

At block 124, user selection of a virtual category is detected. For example, by performing a "point-and-click" operation utilizing a cursor control device, a user may select the "cars" category of the virtual categories 140 shown in FIG. 9A, the selection being communicated to a CGI server 18 that in turn communicates the selection to an appropriate CGI script.

At block 126, a list of next-level virtual category is presented, based on the virtual category selected at block 124. FIG. 9B illustrates an example of a markup language document that may be utilized to present an exemplary list 144 of such mixed-level categories. For example, a CGI script executing within a CGI server 18 and responsive to identification of a user-selected top-level category, may, via the database engine server 22, query the category table 47 to identify virtual categories that are child categories of the "cars" category. The results of this query are then communicated to a page server 12 that populates a template to generate the markup language document illustrated in FIG. 9B. The list 144 of virtual categories shown in FIG. 9B accordingly represents child categories of the "cars" virtual category.

At block 128, a user selection of a next-level virtual category is detected, in the same manner described above. For example, assuming user selection of a hypertext link 146 for the "Ford" category of the list 144 of categories shown in FIG. 9B, this user selection may be communicated to a CGI server 18.

At block 130, a leaf category, or leaf categories, of the virtual category selected at block 128 may, in one embodiment, be identified so as to facilitate presentation of all data items associated with that leaf category or categories. For example, all leaf categories that depend from the virtual "Ford" category selected at block 128 may be identified. Such leaf categories may include the virtual "Taurus" category or the virtual "Model T" category discussed above with reference to FIG. 5.

Where the category selected at block 128 itself comprises a leaf category, it will be appreciated that such a category itself be identified as the leaf category at block 130.

At block 132, a mapping, or linking, operation is performed so as to map the relevant virtual leaf categories identified at block 130 to actual leaf categories. Specifically, as described above, this mapping operation may be performed utilizing a category identifier included within the actual_category field 86 of each relevant virtual category.

Having then identified one or more actual leaf categories corresponding to the virtual leaf categories, at block 134, data items categorized as being attributed to the identified real leaf categories are identified and presented in a user interface.

Figure 9C:
FIG. 9C is an example of a markup language document that may be utilized to present both next level, or leaf, categories and data items identified to a user.

FIG. 9C is an exemplary embodiment of a user interface, in the form of a markup language document, that may be utilized to present both the next level, or leaf, categories identified at block 130 and the data items identified at block 134 to a user. Specifically, the next level virtual categories are shown to be presented at 150, and the identified data items are shown to be presented at 152. It will be noted that the data items presented at 152 include data items within all of the virtual leaf categories listed at 150. Accordingly, the list of data items 152 may be extensive. For this reason, a user may wish to further navigate the hierarchy of virtual categories to further limit the list of data items 152 to a more manageable size.

Returning to FIG. 8, at decision block 136, a determination is made as to whether a user selected a virtual leaf category at block 128. If the selected virtual category is not a leaf category, the method 120 loops back through blocks 126-134. For example, a user may select a hypertext link 154 for the virtual "Taurus" category, responsive to which the user will be presented, at block 134, with a list of data items identified as being within the actual "Taurus" category by performing a link between the virtual "Taurus" category and the actual "Taurus" category.

FIG. 9D is an exemplary user interface, in the form of a markup language document, that illustrates the presenting of such a narrowed list of data items at 156. It will furthermore be noted that the user interface shown in FIG. 9D does not provide a list of any child categories, as were shown at 150 in FIG. 9C, as the virtual "Taurus" category is a leaf category.

User-Classification of a Data Item—User Interfaces

As described above, in one embodiment, a user (e.g., a seller) utilizing the network-based auction facility 10 or an administrator classifying data items for presentation via a web site, may be presented with the option of only classifying data items within the context of a hierarchy of actual (and not virtual) categories.

Figure 10A:
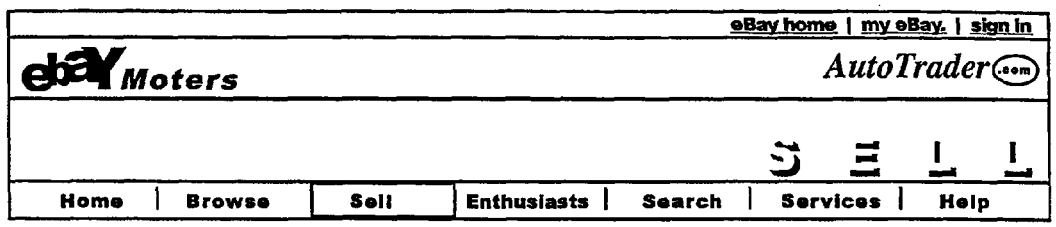
FIG. 10A shows an exemplary user interface, in the form of a markup language document, that facilitates classification by a user of a data item according to actual categories.

FIG. 10A shows an exemplary user interface, in the form of a markup language document, that facilitates classification by a user of a data item according to actual categories 100, such as those shown in FIG. 6. The top-level (or parent) actual categories comprise vehicle types (e.g., a passenger vehicles, commercial trucks, boats, aircraft, etc.). Selection of a passenger vehicle type utilizing a drop-down menu 162 indicates both an actual parent category and an actual child category. Alternatively, the user (i.e., seller) may be offering a further vehicle type for auction. User selection of the drop-down menu 164 allows the seller to specify such a further vehicle type.

FIGS. 10B-10E illustrates a further user interface 170 via which a user (i.e., a seller) may specify actual category information. In an exemplary embodiment, the information inputted by the user at block 172, as shown in FIG. 10B, specifies an actual category. Specifically, for passenger vehicles, a leaf category is defined by a passenger vehicle make and model.

It should thus be noted that, in the exemplary embodiment, data items are classified according to a selected leaf category. Such leaf categories may be viewed as a category path selected within the context of a hierarchy of categories. For example, the full categorization of a data item may be viewed as the "passenger vehicle/Ford/Taurus" categorization.

Software

The methodologies described above may, it will be appreciated, be performed by software modules residing and executing on a wide variety of machines. In one embodiment, the mapping of the virtual leaf categories to actual leaf categories may be performed by a "listings produce" module or object that issues a series of SQL statements against the database 23. The "listings produce" object may reside, for example, on a CGI server 18 or be part of the database engine server 22.

Figure 11:
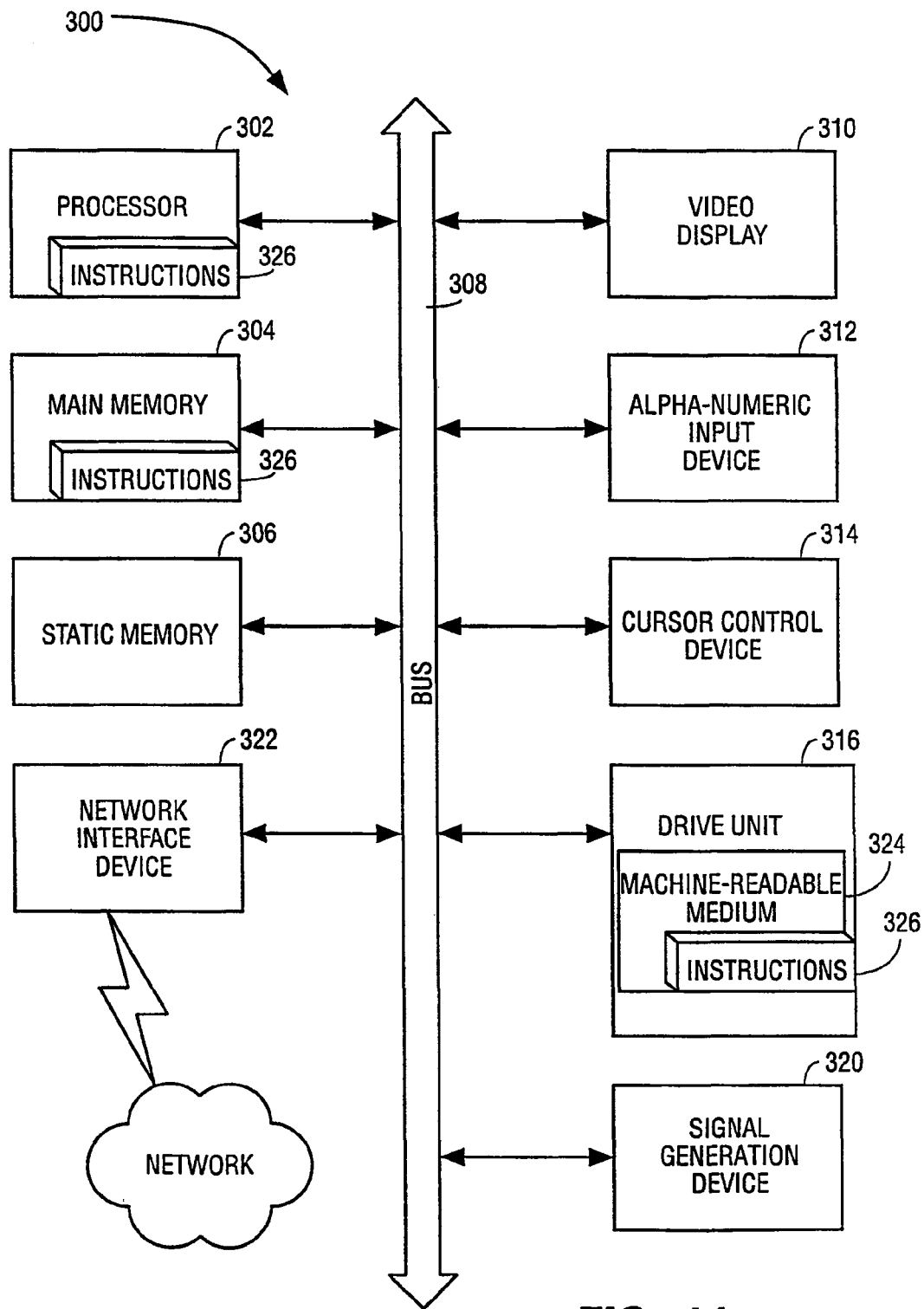
FIG. 11 is a diagrammatic representation of a machine, in the exemplary form of a computer system, within which a set of instructions for causing the machine to perform any of the methodologies discussed above may be executed.

FIG. 11 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for categorizing items in both actual and virtual categories have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of identifying and presenting a plurality of data items, the method including:
   receiving a selection that identifies a parent category;
   identifying a first category and a first plurality of categories based on the parent category, the first plurality of categories including the first category;
   identifying the plurality of data items based on a link from the first category to a second category, the plurality of data items not being user-classifiable under the first plurality of categories, the second category being included in a second plurality of categories that are respectively associated with the first plurality of categories, the plurality of data items being user-classified under the second category; and communicating, over a network, a user interface responsive to the receiving the selection, the user interface including the plurality of data items.

2. The method of claim 1, wherein the first plurality of categories are virtual leaf categories.

3. The method of claim 1, wherein the second plurality of categories are actual leaf categories.

4. The method of claim 1, wherein the plurality of data items are directly categorized as being within the second category and indirectly categorized within the first category.

5. The method of claim 1, wherein the first and second plurality of categories are defined in a category table including a plurality of category records, wherein the plurality of category records include a category record for each category of the first and second plurality of categories.

6. The method of claim 5, wherein each category record within the category table includes a category identifier.

7. The method of claim 6, wherein a category record that describes the first category includes the link, wherein the link includes a category identifier of a category record for the second category.

8. The method of claim 1, wherein the plurality of data items includes a data item, wherein the data item is a database record describing any one of a group consisting of products and services of a transaction facilitated by a network-based transaction facility.

9. The method of claim 1, wherein the user interface includes the first plurality of categories.

10. A system to identify and present a plurality of data items, the system includes:
   a server; and
   a database that stores the plurality of data items, the server to receive a selection that identifies a parent category, the server to identify a first category and a first plurality of categories based on the parent category, the first plurality of categories includes the first category, the server to identify the plurality of data items based on a link from the first category to a second category, the plurality of data items are not user-classifiable under the first plurality of categories, the second category is included in a second plurality of categories that are respectively associated with the first plurality of categories, the plurality of data items are user-classified under the second category, the server to communicate, over a network, a user interface in response to receipt of the selection, the user interface includes the plurality of data items.

11. The system of claim 10, wherein the first plurality of categories are virtual leaf categories.

12. The system of claim 10, wherein the second plurality of categories are actual leaf categories.

13. The system of claim 10, wherein the plurality of data items are directly categorized as being within the second category and indirectly categorized within the first category.

14. The system of claim 10, wherein the first and second plurality of categories are defined in a category table including a plurality of category records, wherein the plurality of category records include a category record for each category of the first and second plurality of categories.

15. The system of claim 14, wherein each category record within the category table includes a category identifier.

16. The system of claim 15, wherein a category record that describes the first category includes the link, wherein the link includes a category identifier of a category record for the second category.

17. The system of claim 10, wherein the plurality of data items includes a data item, wherein the data item is a database record describing any one of a group consisting of products and services of a transaction facilitated by a network-based transaction facility.

18. The system of claim 10, wherein the user interface includes the first plurality of categories.

19. A non-transitory machine-readable medium storing a sequence of instructions that, when executed by a machine, cause the machine to:
   receive a selection that identifies a parent category;
   identify a first category and a first plurality of categories based on the parent category, the first plurality of categories includes the first category;
   identify a plurality of data items based on a link from the first category to a second category, the plurality of data items are not user-classifiable under the first plurality of categories, the second category is included in a second plurality of categories that are respectively associated with the first plurality of categories, the plurality of data items are user-classified under the second category; and
   communicate, over a network, a user interface in response to the receipt of the selection, the user interface includes the plurality of data items.

20. The non-transitory machine-readable medium of claim 19, wherein the machine-readable medium is selected from a group consisting of solid-state memories, optical disks and magnetic disks.

* * * * *